United States Patent [19]
Farrow

[11] Patent Number: 5,757,176
[45] Date of Patent: May 26, 1998

[54] METHOD AND SYSTEM FOR CONTROLLING OUTPUT CURRENT OF A LARGE, LOW-VOLTAGE, DC POWER SUPPLY AND OBTAINING DIAGNOSTIC INFORMATION FROM THE OPERATION THEREOF

[75] Inventor: John F. Farrow, Plymouth, Mich.

[73] Assignee: Medar, Inc., Farmington Hills, Mich.

[21] Appl. No.: 784,990

[22] Filed: Jan. 17, 1997

[51] Int. Cl.$^6$ .................................................. G05B 24/02
[52] U.S. Cl. ........................... 323/320; 323/24.7; 363/97
[58] Field of Search ............................... 323/237, 247, 323/265, 320; 363/97

[56] References Cited

U.S. PATENT DOCUMENTS

| | | | |
|---|---|---|---|
| 3,735,237 | 5/1973 | Derby | 363/8 |
| 3,938,031 | 2/1976 | Blackmond | 323/247 |
| 4,345,139 | 8/1982 | Higgins . | |
| 4,351,022 | 9/1982 | Dolland et al. . | |
| 4,821,202 | 4/1989 | Davis et al. . | |
| 5,149,940 | 9/1992 | Davis et al. . | |
| 5,351,175 | 9/1994 | Blankenship | 363/97 |
| 5,483,463 | 1/1996 | Qin et al. | 364/492 |

*Primary Examiner*—Stuart N. Hecker
*Attorney, Agent, or Firm*—Brooks & Kushman P.C.

[57] ABSTRACT

A method and system for controlling the output current of large, low-voltage, DC power supply which includes at least one transformer primary by controllably switching an AC power line voltage to the primary as a function of actual and desired output currents. SCRs are used to switch, using phase control, the AC primary voltage to the transformer(s) of the power supply in order to control the output current. Given the incoming power line voltage, the current value from the previous power line cycle and the desired current for the present cycle, the function is used to find the SCR firing angle to attain the desired output current in the present power line cycle. Actual measurements of output current and power line voltage are used to modify the function to reflect changes in power line voltage and/or circuit impedance to obtain a modified function. Preferably, instantaneous changes in power line voltage are measured and used to change the input variables to the function in order to provide instantaneous corrections for power line voltage changes. Diagnostic information concerning the operation of the DC power supply is determined from the modified function.

32 Claims, 2 Drawing Sheets

METHOD AND SYSTEM FOR CONTROLLING OUTPUT CURRENT OF A LARGE, LOW-VOLTAGE, DC POWER SUPPLY AND OBTAINING DIAGNOSTIC INFORMATION FROM THE OPERATION THEREOF

TECHNICAL FIELD

This invention relates to methods and systems for controlling output current of large, low-voltage, DC power supplies and obtaining diagnostic information from the operation thereof.

BACKGROUND ART

There are many ways to regulate DC output current of large, low-voltage, DC power supplies (i.e. which supply more than 1,000 amps at a voltage of less than 20 volts. The use of silicon controlled rectifiers (SCRs) to switch the incoming power line to a large DC power supply is a method commonly used to regulate the DC output current of such power supplies. Reference is made to the to Farrow U.S. Pat. No. 4,513,363 for a description of circuitry of such power supplies.

For an explanation of how an SCR works, the reader is referred to the "SCR MANUAL", Sixth Edition (ISBN 0-13-796763-2), published by the General Electric Company. This book is printed and distributed by Prentice-Hall, Englewood Cliffs, N.J. and is generally available at stores which sell electrical engineering reference books.

A technique called "phase control" is used to control the switching of the SCRs in order to regulate the DC output current of the power supply. Reference is made to Chapter 9 in the aforementioned "SCR MANUAL" for an explanation of how phase control is used on an AC power line.

Although very economical and energy-efficient, the method of phase control on the incoming power line to regulate the DC output current of a large, low-voltage DC power supply has several serious shortcomings.

The first shortcoming is that the relationship between the phase angle at which the SCRs are triggered ("fired") and the output DC current is not constant. The relationship is different depending upon whether the current is increasing or decreasing. The relationship is further changed by shifts in power supply load impedance, changes in power supply internal impedances with temperature, and changes in power line voltage.

Another shortcoming is the time lag which accompanies any effort to rapidly change the output DC current of the power supply. Large, low-voltage, DC power supplies are usually used with loads which are inductive in nature. Also, the internal impedances of large DC power supplies are usually inductive. Inductances resist rapid changes in current. Changes in SCR firing angles to achieve a given output DC current do not have the desired effect for as long as 100 milliseconds or more.

Choosing SCR firing angles to properly "anticipate" the lag time due to inductance is difficult because both the time lag itself and the relationship between SCR firing angle and DC output current are shifting as the current ramps up or down and the power line voltage and power supply load impedances change.

The Davis et al. U.S. Pat. Nos. 4,821,202 and 5,149,940 disclose a control system for arc welding. It uses SCRs to do phase control in a three-phase DC system in order to control output current, voltage, or power. Measurements of output voltage and current are used as the input data for the control system. The basis of the control method is a two-dimensional table. One axis is the difference between the desired voltage, current, or power and the most recent measurement of actual voltage, current or power output. The other axis is the first derivative of the voltage, current, or power. The values in the table represent the amount by which the SCR firing angles need to be changed. Different tables are used for voltage, current or power, depending on the operating mode. The tables are modified according to experience. If a value from the table doesn't result in the correct voltage, current or power, that value is adjusted by a small amount to correct for the error.

The Dolland et al., U.S. Pat. No. 4,351,022, discloses particular circuitry used to generated firing pulses for a three-phase rectifier using SCRs for the rectifying elements. Current control is mentioned in the disclosure as an application which uses the circuitry which is the object of this patent, but there is no discussion of the methods of current control. All discussion of current control relates to how the circuitry of this patent would respond to the signal generated by some sort of current control system, not to the current control system itself. The subject of this patent is particular circuitry which changes the timing of SCR firing signals in response to an analog input signal. No mention is made of finding an SCR firing angle to achieve a particular output current.

The Higgins U.S. Pat. No. 4,345,139 discloses a constant current control for an arc welding power supply. The basic method of current control is via an analog feedback loop. The magnitudes of an analog command voltage, a voltage representing the output current and another voltage which represents a filtered and delayed version of the output current are summed together to generate a voltage which sets the SCR firing angle.

SUMMARY OF THE INVENTION

An object of the present invention is to provide a method and system for controlling output current of a large, low-voltage, DC power supply wherein AC power line voltage to a transformer primary of the supply is controllably switched as a function of actual and desired output currents to generate the desired output current.

Another object of the present invention is to provide a method and system for controlling output current of a large, low-voltage, DC power supply which method and system constantly adapts themselves to the present operating conditions. The control method and system also adapt in their "anticipation" to reduce the time lag to achieve a desired DC output current.

Still another object of the present invention is to provide a method and system for obtaining diagnostic information concerning the operation of a large, low-voltage, DC power supply from a modified function which is used to controllably switch an AC power line voltage to a transformer primary of the power supply.

In carrying out the above objects and other objects of the present invention, a method is provided for controlling output current of a large, low-voltage, DC power supply. The power supply includes a transformer having a primary adapted to receive an AC power line voltage having a number of power line cycles per second. The method includes the steps of coupling the AC power line voltage to the primary of the transformer to generate output current in a first power line cycle, determining actual output current in the first power line cycle, and determining a desired output current in a second power line cycle following the first power line cycle. The method also includes the step of controllably switching the AC power line voltage to the primary of the transformer as a function of the actual and desired output currents to generate the desired output current in the second power line cycle.

Preferably, the method further includes the step of modifying the function based on actual output current and desired output current in the second power line cycle to obtain a modified function.

Further in carrying out the above objects and other objects of the present invention, a method is provided for obtaining diagnostic information concerning the operation of a large, low-voltage, DC power supply. The power supply includes a transformer having a primary adapted to receive an AC power line voltage having a number of power line cycles per second. The method includes the step of coupling the AC power line voltage to the primary of the transformer to generate output current during a first power line cycle. The method also includes the steps of determining actual output current in the first power line cycle, determining a desired output current in a second power line cycle following the first power line cycle, and controllably switching the AC power line voltage to the primary of the transformer as an original function of the actual and desired output currents in the second power line cycle. The method finally includes the step of modifying the original function based on the actual output current and the desired output current in the second power line cycle to obtain a modified function. The modified function and a difference between the modified function and the original function provide the diagnostic information.

Preferably, the above methods further include the step of determining AC power line voltage wherein the step of controllably switching is also based on the AC power line voltage.

Still further in carrying out the above objects and other objects of the present invention, a system is provided for controlling output current of a large, low-voltage, DC power supply. The power supply includes a transformer having a primary adapted to receive an AC power line voltage having a number of power line cycles per second. The system includes a power switching device for coupling the AC power line voltage to the primary of the transformer to generate output current in a first power line cycle and a current sensor for sensing actual output current in the first power line cycle and providing an output current signal. The system also includes a controller coupled to the current sensor to process the output current signal. The controller determines a desired output current in a second power line cycle following the first power line cycle and controls the power switching device to switch the AC power line voltage to the primary of the transformer as a function of the actual and desired output currents to generate the desired output current in the second power line cycle.

Yet further in carrying out the above objects and other objects of the present invention, a system is provided for obtaining diagnostic information concerning the operation of a large, low-voltage, DC power supply. The power supply includes a transformer having a primary adapted to receive an AC power line voltage having a number of power line cycles per second. The system includes a power switching device for coupling the AC power line voltage to the primary of the transformer to generate output current in a first power line cycle. The system also includes a current sensor for sensing actual output current in the first power line cycle and providing an output current signal. The system finally includes a controller coupled to the current sensor to process the output current signal. The controller: (1) determines a desired output current during a second power line cycle following the first power line cycle; (2) controls the power switching device to switch the AC power line voltage to the primary of the transformer as an original function of the actual and desired output currents in the second power line cycle; and (3) modifies the original function based on the actual output current and the desired output current in the second power line cycle to obtain a modified function. The modified function and a difference between the modified function and the original function provide the diagnostic information.

Preferably, the function is represented by at least one multi-dimensional table having a plurality of entries and at least one of the entries is modified is based on the actual output current and the desired output current in the second power line cycle to obtain a modified table.

Each of the entries preferably represents a firing angle such as an SCR firing angle to generate the desired output current.

The method and system of the present invention are different from the Davis et al. U.S. Pat. Nos. 4,821,202 and 5,149,940 for a number of reasons. For example:

1. The tables used in the present method and system are indexed by different parameters (i.e. previous instantaneous current and desired instantaneous current rather than error and derivative of the signal) and contain different values (SCR firing angle rather than SCR firing angle correction).

2. The '940 and '202 patents disclose no method of correcting for the incoming power line voltage or even measuring it. Only the present method and system disclose and claim a method of correcting for power line voltage changes.

3. The modification to the tables in the '940 and '202 patents are not directly a function of the difference between the desired value and the actual value of the parameter being controlled (i.e. voltage, current, or power) but are simply fixed values either added to or subtracted from the values in the table.

4. In the '940 and '202 patents, the SCRs are located on the secondary of the welding transformer, not the primary. In addition, in the '940 and '202 patents, the SCRs also serve as the rectification elements to generate a DC output current. In contrast, the method and system of the present invention use SCRs in the primary circuit of the welding transformer and separate rectifier diodes are used in the secondary circuit to convert the AC output of the welding transformer to DC. The basic circuitry using SCRs in the secondary circuit of the welding transformer as disclosed in the '940 and '202 patents would not work in the present method and system. This is due to the very inductive nature of the load and internal impedances of large, low-voltage, DC power supplies. If the circuitry of the '940 and '202 patents was used in the large, low-voltage, DC power supplies which are commonly used for resistance welding, the inductances in the circuit would never allow the current through the SCRs to go to zero and, since that is the only way to turn an SCR off, there would be no way to stop the welding current.

5. Placing the SCRs in the secondary circuit as disclosed in the '940 and '202 patents makes control easier because the flux balance of the welding transformer core need not be considered when SCR firing angles are chosen. Any time a correction to the SCR firing angles is needed, it can be done. In contrast, the present method and system require that the SCR firing angles be kept balanced for the positive and negative half-cycles applied to the primary of the welding transformer. This has the effect of requiring changes to SCR firing angles be done once per cycle and at the same time within a cycle.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
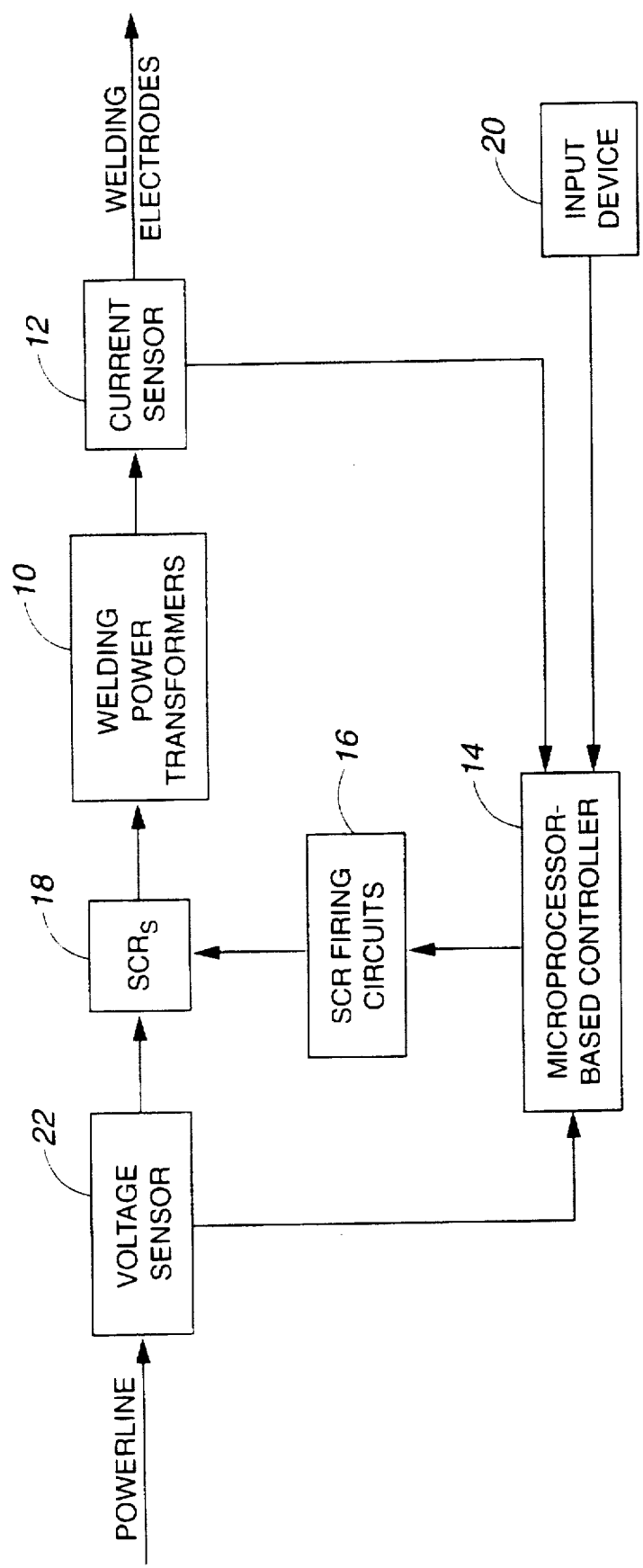
FIG. 1 is a schematic block diagram of a large, low-voltage, DC power supply such as a welding power transformer and a system for controlling the output current thereof in accordance with the present invention.

Referring to FIG. 1, in order to achieve accurate current control of a large, low-voltage, DC power supply such as a welding power transformer(s) 10, output (secondary) current measurement is used in the method and system of the present invention as indicated by a current sensor 12. The current sensor 12 may be a conventional Hall-effect generator or sensor.

In the following discussion, it is assumed that output current measurements are taken as averages over half-cycle long intervals. That is, two current readings are taken per cycle, one on each half-cycle.

The basis of this current control by a microprocessor-based controller 14 coupled to the sensor 12 is a mathematical function which takes as its input variables: (1) the instantaneous output DC current at the end of the previous cycle, and (2) the instantaneous output DC current desired at the end of the present cycle. The output of the mathematical function is an SCR firing angle coupled to SCR firing circuits 16 which, in turn, fire SCRs 18 to achieve the desired current across welding electrodes (not shown).

The controller 14 typically includes A/D and D/A circuits to convert analog signals to be processed into digital signals for use by its microprocessor and to convert digital signals into analog signals for use by the SCR firing circuits 16, respectively.

The "SCR firing angle" is the duration of time between the zero-crossing of the power line voltage and the instant when an SCR connected to that power line has excitation current applied to its gate terminal. The excitation current causes the SCR to switch from its OFF state (not conducting current) to its ON stage (conducting current). This is commonly called "firing" the SCR.

The SCR firing angle is most commonly expressed in units of angular displacement, usually degrees. 360 degrees represents one complete cycle of the sinusoidal power line voltage. The zero-degree point is usually taken to be the negative-to-positive transition through zero volts of the incoming power line voltage. For three-phase systems, the zero-degree point is the negative-to-positive transition of the one phase selected to be the reference phase.

Figure 2:
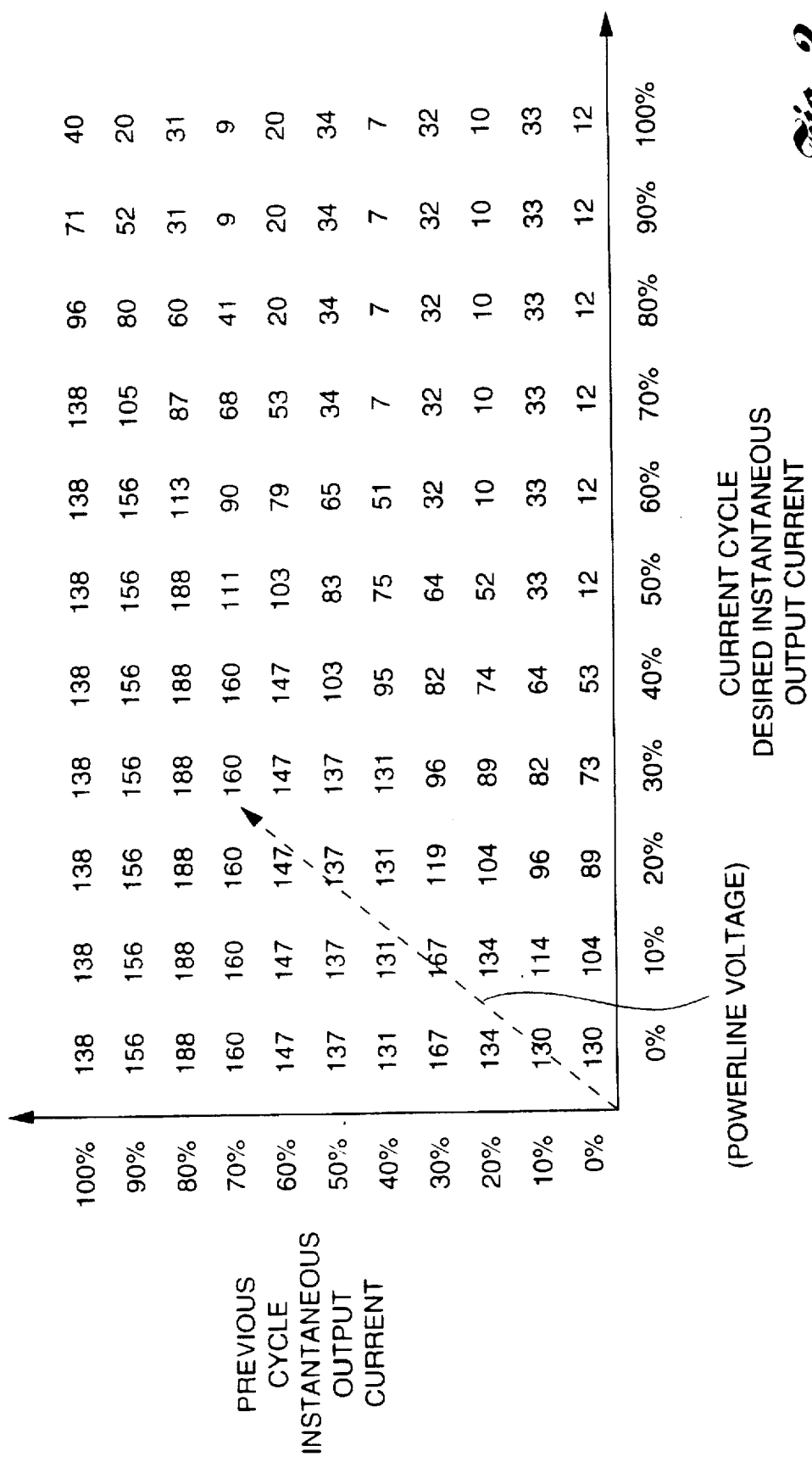
FIG. 2 is a multi-dimensional table stored in a memory of a microprocessor-based controller of FIG. 1 and utilized in the method and system of the present invention.

One way to represent the previously mentioned function is a two-dimensional table with 121 entries stored in memory accessible by the microprocessor of the controller 14. An example of such a table is illustrated in FIG. 2. Each of the 121 entries in the table represents an SCR firing angle. The range of valid SCR firing angles is between 40 and 130 degrees. Values outside this range exist in the table to allow interpolation at the "edges" of the valid values.

The vertical axis of the table in FIG. 2 is 11 values representing current from the previous cycle. The vertical axis is indexed from zero to 100 percent current in ten percent steps. Initially, the value for 100 percent current is preset; this value is adjusted later as described below.

The currents used to access the vertical axis of the table are the instantaneous currents attained at the end of each cycle. These instantaneous currents are extrapolated from the two average current readings taken during each of the two half-cycles in each cycle. The formula used to compute these instantaneous currents is shown in Equation 1:

$$CINST = IAVNEG*(1+EFACT) - IAVPOS*EFACT \quad (1)$$

where:
IAVPOS=Average current during positive (first) half-cycle;
IAVNEG=Average current during negative (second) half-cycle;
CINST=Extrapolated instantaneous current at the end of the cycle; and
EFACT=Extrapolation factor, typical value is 0.45.

The extrapolation factor (EFACT in Equation 1) can also be called the "damping factor" since changing it affects the response time of the control system. Increasing the value (up to about 1) slows the response and reduces current overshoot. Decreasing the value (down to about 0.2), speeds the response time but can cause current overshoot and some oscillation around the desired value. Experimentation has found that a value of 0.45 results in acceptable response time without excessive overshoot. Although the value of EFACT is not very critical, different load and power supply impedances can result in a different optimum value for EFACT, so this value is user-adjustable over the range of 0 to 1.

The horizontal axis of the table in FIG. 2 is 11 values representing the instantaneous current desired at the end of the present cycle. It is indexed from zero to 100 percent in ten percent steps. The value used for 100 percent current on the horizontal axis is the same as that used for the vertical axis. The desired current is typically input to the controller 14 by a user from an input device 20 of FIG. 1. The desired current may be a function which is input at the input device 20 by a user. The controller 14 then determines the proper value to access the table of FIG. 2.

Since the table has steps of 10 percent current on both axes, interpolation is used for the intermediate values. A four-way interpolation is done using the value of current at the end of the previous cycle and the current desired at the end of the upcoming cycle.

The firing angle table of FIG. 2 deals with instantaneous currents at the end of cycles, not the average current over the entire cycle. The value of current for the previous cycle (vertical axis) is the instantaneous current reached at the end of that cycle. The value of the desired current (horizontal axis) is the instantaneous current desired at the end of the present cycle. Only in the steady-state case (current not ramping up or down) are the instantaneous and average currents equal. The use of instantaneous current is made necessary by the fact that the current changes in a large, low-voltage, DC power supply are slowed by circuit inductances.

Initially, a user-entered value at the input device 20 is used for the 100 percent current value. If a measured or sensed current by the sensor 12 ever exceeds this user-entered value, the user-entered 100 percent value is adjusted upward to equal this higher value.

The table illustrated in FIG. 2 and the current readings taken every half-cycle are used to control the output current according to the following numbered steps:

1. At the start, when the power supply output current is zero, an SCR firing angle is selected from the table of FIG. 2 by the programmed microprocessor of the controller 14. Since the instantaneous current at the end of the previous cycle is zero, the firing angle is selected from the bottom line of the table according to the desired current. This process is illustrated in the First Basic Program Listing shown below.

2. If the SCR firing angle selected from the table is less than 40 degrees, a value of 40 degrees is used; if the firing angle selected from the table is greater than 130 degrees, 130 degrees is used.

3. The SCRs 18 are fired by the SCR firing circuits 16 based on signals from the controller 14 for one cycle at the firing angle which has been selected from the table.

4. At the end of the cycle, the two half-cycle average current readings are used to extrapolate the instantaneous current at the end of the cycle. Equation 1 above is used for this calculation.

4.1. Apply corrections to the firing table. (See the explanations concerning Equation 2 and the Second Basic Program Listing below.)

5. The result of Equation 1, together with the desired current is used to access the table of FIG. 2 and obtain another SCR firing angle. This process is illustrated in the First Basic Program Listing shown below.

6. Go back to step 2, above.

In the above six steps, all values of current are divided by the 100 percent current value so that the values used to access the table are in terms of percentage of maximum current, not absolute current. In this way, the same table can be used for any magnitude of current simply by scaling the 100 percent current value.

```
1050  'subroutine to find the firing angle to achieve a desired current
1060  'subroutine name is FFA
1070  'Entry variables are:
1080  'CINST = instantaneous current at the end of the previous cycle
1090  'DINST = instantaneous current desired at the end of this cycle
1100  'HNDPCNTA = 100 percent current value
1110  'Exit variables are:
1120  'FASEL = firing delay angle which achieves DINST, interpolated
       from FACUR table
1130  IF CINST>=HNDPCNTA THEN HNDPCNTA=CINST+1 'if
       needed, reset 100% value
1140  IF DINST>=HNDPCNTA THEN DINST=HNDPCNTA-1 'dis-
       allow more than 100%
1150  IF DINST<1 THEN DINST=1 'disallow zero and negative numbers
1160  INDX1=INT(10*(CINST/HNDPCNTA)) 'indices into firing table
1170  INDX2=INT(10*(DINST/HNDPCNTA)) 'indices define the lower-
       left corner of the four values used for interpolation
1180  PRINT INDX1,INDX2 'Print indices to reassure that we're in the
       right place
1190  FACT1=FACUR(INDX1,INDX2) 'get lower-left value to
       interpolate from
1200  FACT3=FACUR(INDX1+1,INDX2) 'get upper-left value to
       interpolate from
1210  FACT2=FACUR(INDX1,INDX2+1) 'get lower-right value to
       interpolate from
1220  FACT4=FACUR(INDX1+1,INDX2+1) 'get upper-right value to
       interpolate from
1230  INTHL=(INDX2+1)-(10*DINST/HNDPCNTA) 'left-hand
       interpolation fraction
1240  INTHR=(10*DINST/HNDPCNTA)-INDX2 'right-hand
       interpolation factor
1250  INTVD=(INDX1+1)-(10*CINST/HNDPCNTA) 'lower
       interpolation factor
```

-continued

```
1260  INTVU=(10*CINST/HNDPCNTA)-INDX1 'upper interpolation
       factor
1270  FASEL=INTHL*INTVD*FACT1+INTHL*INTVU*FACT3+
       INTHR*INTVD*FACT2+INTHR*INTVU*FACT4 'interpolate to
       find the firing angle for this desired current
1280  RETURN
```

After each cycle of current, (i.e. step 4.1 in the list above), the table of FIG. 2 is updated to reflect what actually happened during that cycle. If the current was too low, the firing angle value in the table is decreased to cause an increase in current. If the current is too high, the firing angle is increased to cause a decrease of output current. The amount of this adjustment is proportional to the amount of difference between the desired current for a particular cycle and the current which actually resulted.

When an "adjustment" is performed on the table, the adjustment is applied proportionally to all of the four values in the table which were used in the interpolation to select the firing angle used for the just-prior cycle. The same interpolation values used to select a firing angle at the beginning of a cycle are used to apply the correction to the table once the actual current for that cycle has been measured.

This process is illustrated in the Second Basic Program Listing below which re-adjusts the values in the table based on a variable FASELD, which is proportional to the difference between the actual and desired current at the end of the just-previous cycle. The relationship between the value of FASELD and the difference between the actual and desired currents is not terribly critical. The value of FASELD is kept below the value which causes overcorrection to the table. This overcorrection causes "hunting" in finding table values and can result in never arriving at the correct values. An equation which has worked well to compute FASELD in empirical tests is shown in Equation 2 below. FASELD is expressed in firing angle degrees.

$$FASELD=((CINST-DINST)/HNDPCNT)*60 \qquad (2)$$

where:

CINST=Actual instantaneous current at the end of this cycle;

DINST=Desired current at the end of this cycle; and

HNDPCNT=100 percent current value.

```
880  'Subroutine to adjust the values in the FACUR array, based on
      experience
890  'The input values are:
900  'FASELD = Firing angle correction factor based on the difference
      between the desired and actual currents in the previous cycle
910  'INTHL, INTHR, INTVD, INTVU = Interpolation factors for
      previous half-cycle from subroutine FFA
920  'INDX1, INDX2 = Firing table indices for previous cycle from
      subroutine FFA
930  IF INTHL>INTHR THEN INTHF=INTHL ELSE INTHF=INTHR
      'Find largest left-right interpolation factor
940  IF INTVU>INTVD THEN INTVF=INTVU ELSE INTVF=INTVD
      'Find largest up-down interpolation factor
950  INTF=INTHF*INTVF 'Compute product of the two largest
      interpolation factors; firing table corrections are scaled by
      this number
960  NEWFC1=FACUR(INDX1,INDX2)+FASELD*INTHL*INTVD/
      INTF 'Compute lower-left firing table correction
970  FACUR(INDX1,INDX2)=NEWFC1 'Change lower-left firing table
      value
980  NEWFC2=FACUR(INDX1,INDX2+1)+FASELD*INTHR*
      INTVD/INTF 'Compute lower-right table correction
990  FACUR(INDX1,INDX2+1)=NEWFC2 'Change lower-right firing
```

-continued

```
      table value
1000  NEWFC3=FACUR(INDX1+1,INDX2)+FASELD*INTHL*
      INTVU/INTF 'Computer upper-left firing table correction
1010  FACUR(INDX1+1,INDX2)=NEWFC3 'Change upper-left firing
      table value
1020  NEWFC4=FACUR(INDX1+1,INDX2+1)+FASELD*INTHR*
      INTVU/INTF 'Compute upper-right firing table correction
1030  FACUR(INDX1+1,INDX2+1)=NEWFC4 'Change upper-right
      firing table value
1040  RETURN
```

If the power line voltage differs from a nominal value, the indices used to access the table are adjusted by some amount. Preferably, power line voltage is sensed by a voltage sensor 22 which is coupled to the controller 14 of FIG. 1 to provide an analog signal representative of AC power line voltage. The signal is converted into a digital signal by an A/D converter of the controller 14 for use by the microprocessor of the controller 14.

Due to the "corrective" actions applied to the table after each cycle, the amount of adjustment of the indices for a given power line voltage difference from nominal is relatively unimportant. All that matters is that a different area of the two-dimensional table is used for each power line voltage value. Essentially, a different section of the table is used for each power line voltage value. Within each section of the table, the table "learns" the correct firing angles to achieve the desired output current with this power supply, with this load impedance and at that power line voltage.

A method of adjusting the firing table indices to compensate for power line voltage changes that works well for higher operating currents (above 50% of power supply capability) is to adjust the 100 percent current value up and down in direct proportion to the ratio between the actual power line voltage and the assumed nominal power line voltage. At the higher currents, this method generates sufficient "movement" along both the horizontal and vertical axes so that the areas of the table used for different power line voltages are separated enough to allow good resolution.

At lower operating currents, however, the amount of "movement" along the axes becomes insufficient to allow good resolution for accurate power line voltage compensation. Many different methods to increase "movement" along the axes can be used. One method is to make the change in the 100 percent current value a function of the desired current as well as the power line voltage. This is illustrated in Equation 3 below:

$$HNDPCNTA=HNDPCNT*(1+((PWRVOLT/NOMVOLT)-1)*(HNDPCNT/DESCUR)) \quad (3)$$

where:
HNDPCNT=100 percent current value;
HNDPCNTA=Adjusted 100 percent-current value;
NOMVOLT=Assumed nominal power line voltage;
PWRVOLT=Measured power line voltage; and
DESCUR=Desired output current.
Note: The ranges of the variables PWRVOLT and DESCUR need to be restricted so that the value of HNDPCNTA does not become less than DESCUR or go to infinity.

Another way to perform power line voltage compensation is to use multiple tables like the one illustrated in FIG. 2 and have a separate table for each possible power line voltage.

Another way to look at these multiple tables is to consider them as one three-dimensional table, as indicated by an additional phantom axis labeled "power-line voltage". This is equivalent to adding another input variable (power line voltage) to the mathematical function which the tables represent.

A variation on this method is to have only a few tables for specific values of power line voltage and interpolate between them for intermediate power line voltage values.

The discussion so far has made no mention of whether this method applies to single-phase or three-phase DC power supplies. In fact, it applies to both. The only difference between the algorithm to control single-phase power supplies and three-phase supplies is the firing table of FIG. 2. The table shown in FIG. 2 is the three-phase version.

In fact, due-to the "updating" of the table as explained around Equation 2 and the Second Basic Program Listing, it doesn't really matter which table is used. After only a few dozen welds, the algorithm modifies the values in the table so that they yield the correct current. This "learning" process is especially quick when the current required during each weld is the same. Under this condition all the corrections are applied to the one small area of the table used for that current.

Depending upon the precision required for the SCR firing angle values, the values in the table of FIG. 2 can be either 8 or 16-bit values. They can also be in terms of "raw" binary numbers used to load counters of the controller 14 which are used to generate the firing signals to the circuits 16 to fire the SCRs 18. Units of time rather than degrees can be used in the table, with the recognition that the formula for FASELD (Equation 2) needs to be adjusted accordingly.

Diagnostic information on the DC power supply and load can be obtained from the corrections required to the mathematical functions or tables. Certain patterns of corrections can indicate such things as shorted diodes in the DC power supply or a load impedance which is too high or too low. Such information can be used to decide to shut the power supply down and indicate the source of the problem.

Nothing in the control method is particular to any power line frequency.

While the best mode for carrying out the invention has been described in detail, those familiar with the art to which this invention relates will recognize various alternative designs and embodiments for practicing the invention as defined by the following claims.

What is claimed is:

1. A method for controlling output current of a large, low-voltage, DC power supply, the power supply including a transformer having a primary adapted to receive an AC power line voltage having a number of power line cycles per second, the method comprising the steps of:

coupling the AC power line voltage to the primary of the transformer to generate output current in a first power line cycle;

determining actual output current in the first power line cycle;

determining a desired output current in a second power line cycle following the first power line cycle; and controllably switching the AC power line voltage to the primary of the transformer as a function of the actual and desired output currents to generate the desired output current in the second power line cycle.

2. The method of claim 1 wherein the step of determining the actual output current includes the step of sensing the actual output current at the end of the first power line cycle.

3. The method of claim 1 wherein the step of determining the desired output current includes the step of receiving a signal representing the desired output current at the end of the second power line cycle.

4. The method of claim 1 further comprising the step of determining AC power line voltage wherein the step of controllably switching is also based on the AC power line voltage.

11

5. The method of claim 4 wherein the function is represented by at least one multi-dimensional table having a plurality of sections and wherein the step of controllably switching includes the step of accessing a particular section of the plurality of sections based on the AC power line voltage.

6. The method of claim 4 wherein the function is represented by a plurality of multi-dimensional tables and wherein the step of controllably switching includes the step of selecting at least one of the plurality of multi-dimensional tables based on the AC power line voltage.

7. The method of claim 1 further comprising the step of modifying the function based on actual output current and desired output current in the second power line cycle to obtain a modified function.

8. The method of claim 1 wherein the function is represented by at least one multi-dimensional table having a plurality of entries.

9. The method of claim 8 further comprising the step of modifying at least one of the entries based on the actual output current and the desired output current in the second power line cycle to obtain a modified table.

10. The method of claim 8 wherein each of the entries represents a firing angle to generate the desired output current.

11. The method of claim 10 wherein each of the firing angles is an SCR firing angle.

12. The method of claim 8 wherein the at least one multi-dimensional table includes an axis having values representing actual output current during the first power line cycle and wherein the step of controllably switching includes the step of accessing the axis with an instantaneous actual output current at the end of the first power line cycle.

13. The method of claim 12 wherein the first power line cycle includes two half cycles and wherein the instantaneous actual output current is based on average actual output current during each half cycle of the first power line cycle.

14. The method of claim 1 wherein the function is represented by a 3-D table having a plurality of entries.

15. The method of claim 1 wherein the function is represented by a predetermined number of 2-D tables.

16. A method for obtaining diagnostic information concerning the operation of a large, low-voltage, DC power supply, the power supply including a transformer having a primary adapted to receive an AC power line voltage having a number of power line cycles per second, the method comprising the steps of:

coupling the AC power line voltage to the primary of the transformer to generate output current during a first power line cycle;

determining actual output current in the first power line cycle;

determining a desired output current in a second power line cycle following the first power line cycle;

controllably switching the AC power line voltage to the primary of the transformer as an original function of the actual and desired output currents in the second power line cycle; and modifying the original function based on the actual output current and the desired output current in the second power line cycle to obtain a modified function wherein the modified function and a difference between the modified function and the original function provide the diagnostic information.

17. A system for controlling output current of a large, low-voltage, DC power supply, the power supply including

12 a transformer having a primary adapted to receive an AC power line voltage having a number of power line cycles per second, the system comprising:

a power switching device for coupling the AC power line voltage to the primary of the transformer to generate output current in a first power line cycle;

a current sensor for sensing actual output current in the first power line cycle and providing an output current signal; and a controller coupled to the current sensor to process the output current signal, the controller determining a desired output current in a second power line cycle following the first power line cycle and controlling the power switching device to switch the AC power line voltage to the primary of the transformer as a function of the actual and desired output currents to generate the desired output current in the second power line cycle.

18. The system of claim 17 wherein the current sensor senses the actual output current at the end of the first power line cycle.

19. The system of claim 17 wherein the controller is adapted to receive a signal representing the desired output current at the end of the second power line cycle.

20. The system of claim 17 further comprising a voltage sensor for sensing AC power line voltage and providing an output voltage signal wherein the controller is coupled to the voltage sensor for processing the output voltage signal, the controller controlling the power switching device also based on the AC power line voltage.

21. The system of claim 20 wherein the controller includes a memory and wherein the function is represented by at least one multi-dimensional table having a plurality of sections stored in the memory and wherein the controller accesses a particular section of the plurality of sections based on the AC power line voltage.

22. The system of claim 20 wherein the controller includes a memory and wherein the function is represented by a plurality of multi-dimensional tables stored in the memory and wherein the controller selects at least one of the plurality of multi-dimensional tables based on the AC power line voltage.

23. The system of claim 17 wherein the controller modifies the function based on actual output current and desired output current in the second power line cycle to obtain a modified function.

24. The system of claim 17 wherein the controller includes a memory and wherein the function is represented by at least one multi-dimensional table having a plurality of entries stored in the memory.

25. The system of claim 24 wherein the controller modifies at least one of the entries based on the actual output current and the desired output current in the second power line cycle to obtain a modified table stored in the memory.

26. The system of claim 24 wherein each of the entries represents a firing angle to generate the desired output current.

27. The system of claim 26 wherein the power switching device includes at least one SCR and wherein each of the firing angles is an SCR firing angle.

28. The system of claim 24 wherein the at least one multi-dimensional table includes an axis having values representing actual output current during the first power line cycle and wherein the controller accesses the axis with an instantaneous actual output current at the end of the first power line cycle.

29. The system of claim 28 wherein the first power line cycle includes two half cycles and wherein the instantaneous actual output current is based on average actual output current during each half cycle of the first power line cycle.

30. The system of claim 17 wherein the controller includes a memory and wherein the function is represented by a 3-D table having a plurality of entries stored in the memory.

31. The system of claim 17 wherein the controller includes a memory and wherein the function is represented by a predetermined number of 2-D tables stored in the memory.

32. A system for obtaining diagnostic information concerning the operation of a large, low-voltage, DC power supply, the power supply including a transformer having a primary adapted to receive an AC power line voltage having a number of power line cycles per second, the system comprising:

a power switching device for coupling the AC power line voltage to the primary of the transformer to generate output current in a first power line cycle;

a current sensor for sensing actual output current in the first power line cycle and providing an output current signal; and a controller coupled to the current sensor to process the output current signal, the controller: determining a desired output current during a second power line cycle following the first power line cycle; controlling the power switching device to switch the AC power line voltage to the primary of the transformer as an original function of the actual and desired output currents in the second power line cycle; and modifying the original function based on the actual output current and the desired output current in the second power line cycle to obtain a modified function wherein the modified function and a difference between the modified function and the original function provide the diagnostic information.

* * * * *